United States Patent [19]

Ishikawa

[11] Patent Number: 4,771,682
[45] Date of Patent: Sep. 20, 1988

[54] PEELING MACHINE
[75] Inventor: Shigeru Ishikawa, Tokyo, Japan
[73] Assignee: Muro Kinzoku Kogyo Co., Ltd., Tokyo, Japan
[21] Appl. No.: 901,195
[22] Filed: Aug. 28, 1986
[30] Foreign Application Priority Data
  Jan. 29, 1986 [JP] Japan .................................. 61-17648
[51] Int. Cl.4 ............................................. A23N 7/00
[52] U.S. Cl. ...................................... 99/593; 99/590; 99/594
[58] Field of Search ................. 99/537, 486, 539–541, 99/546, 547, 584, 591, 588–590, 593–595, 623, 635–637, 643; 426/482, 484, 512, 514, 518

[56] References Cited
U.S. PATENT DOCUMENTS

| 3,058,502 | 10/1962 | Loveland et al. | 99/593 X |
| 3,067,791 | 12/1962 | Boyce | 99/593 |
| 3,113,603 | 12/1963 | Gardiner | 99/593 |
| 4,108,565 | 8/1978 | Janssen | 99/593 X |
| 4,503,761 | 3/1985 | Cailloux | 99/590 X |

Primary Examiner—Timothy F. Simone
Attorney, Agent, or Firm—Oblon, Fisher, Spivak, McClelland & Maier

[57] ABSTRACT

This invention concerns a peeling machine for stripping skin and other unedible portions from a fruit or vegetables, more particularly, a peeling machine which can be used effectively for peeling an object which has a soft layer between an outer skin and flesh. This invention is based on a finding that a blade is generally imparted with a better incisive quality when it is pressed against an object and moved in the direction of its cutting edge, as compared with a case where it is simply pressed against the object. Namely, according to the invention, a cup-shaped rotary blade with a cutting edge along the brim of a cup-shaped body is put in rotation and moved along the profile of a fruit or vegetable.

17 Claims, 7 Drawing Sheets

PEELING MACHINE

BACKGROUND OF THE INVENTION

1. Field of the Invention

This invention relates to a machine for peeling fruits or vegetables which is particularly suitable for peeling citrus fruits such as grapefruit, orange, summer or bitter orange or the like.

2. Description of Prior Art

There have been proposed various peeling machines for automatically stripping outer skins of not only citrus fruits but also various other fruits and vegetables. The conventional peeling machines ordinarily employs a rotary clamp mechanism to rotate a fruit or vegetable while holding its opposite ends between clamp members and while contacting the fruit or vegetable with a cutting blade which is fixed relative to the surface of the fruit or vegetable.

Peeling machines of this sort have no problem with relatively hard fruits like apples which can be peeled easily, but have difficulties in cutting off skins with relatively soft tissues, for example, the white cotton-like layers under the yellow outer skins of citrus fruits such as grapefruit, orange and bitter orange. It is often the case that the fruit juice is squeezed out and scattered as the soft tissues are compressed without being cut off sharply by the cutting blade. Accordingly, the conventional peeling machines are limited to particular kinds of fruits or vegetables.

In the following description and appended claims, the term "fruit" comprehends soft and stone fruist and fruit-like vegetables which have edible flesh under a skin.

OBJECTS OF THE INVENTION

It is an object of the present invention to provide a peeling machine which is applicable not only a relatively hard fruits and vegetables which can be easily stripped by machine-peeling, but also to fruits and vegetables with a relatively soft skin like citrus fruits which are normally difficult to strip by machine-peeling.

It is another object of the present invention to provide a peeling machine, employing an inverted cup-shaped rotary peeling blade, in combination with a chute located beneath the rotary blade to receive the strips of peeled skin dropped from the rotary peeling blade, and a receptacle member located beneath a clamp mechanism to receive a peeled fruit or vegetable after a peeling operation, thereby facilitating disposal of the stripped skin and ejection of the peeled fruit or vegetable.

It is a further object of the invention to provide a peeling machine which can remove the skin, core and calyx or stem portions at the opposite ends of a fruit or vegetable in one and the same clamp position on the peeling machine.

A still another object of the invention is to provide a peeling machine which is adjustable to a position suitable for the size of fruits or vegetables to be peeled, promptly in a facilitated manner according to the average dimensions of the fruits or vegetables.

SUMMARY OF THE INVENTION

In accordance with the present invention, the above-mentioned objects are achieved by the provision of a peeling machine which essentially comprises: a rotary clamp mechanism for gripping and rotating a fruit or vegetable between a pair of clamp members, and a peeling cutter having a cup-shaped rotary peeling blade rotated about its center axis by a drive mechanism and movable along the profile of the outer skin of the fruit or vegetable, maintaining the axis of rotation of the rotary blade held in a direction tangential to the surface of the fruit or vegetable rotating on the rotary clamp mechanism.

With this arrangement, the cup-shaped peeling blade which is rotated about its center axis is brought into contact with the surface of a fruit or vegetable rotating on the rotary clamp mechanism which holds the opposite ends of the fruit or vegetable. In this instance, the cutting edge of the rotary blade in contact with the fruit or vegetable skin is continuously moved in the direction of the cutting edge, so that it can sharply cut off even a fruit or vegetable skin which is relatively difficult to cut by a fixed blade, without squeezing or scattering the fruit or vegetable juice. While cutting off the skin in this manner, the rotary peeling blade is moved along the profile of the outer skin of the fruit or vegetable to strip the skin from the entire surfaces of the fruit or vegetable.

With the above-described peeling machine of the invention, a fruit or vegetable is stripped by a rotating cup-shape peeling blade while the fruit or vegetable itself is rotated. Therefore, the peeling blade is imparted with a high incisive power, sharply and clearly cutting off even soft skins of citrus fruits without scattering peeled skin strips or fruit juice.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Referring to FIGS. 1 to 4, there is illustrated a fruit peeling machine embodying the present invention which includes as its major components a rotary clamp mechanism 1 for rotating and holding the opposite ends of a fruit A, a corer 4 for removing the core of the fruit A, an end cutter 5 for cutting off the opposite end portions of the fruit including its stem or calyx portion, and a peeler 6 including a cup-shaped rotary peeling blade and a feed mechanism for moving the peeling blade along the profile of the outer skin of the fruit.

Figure 1:
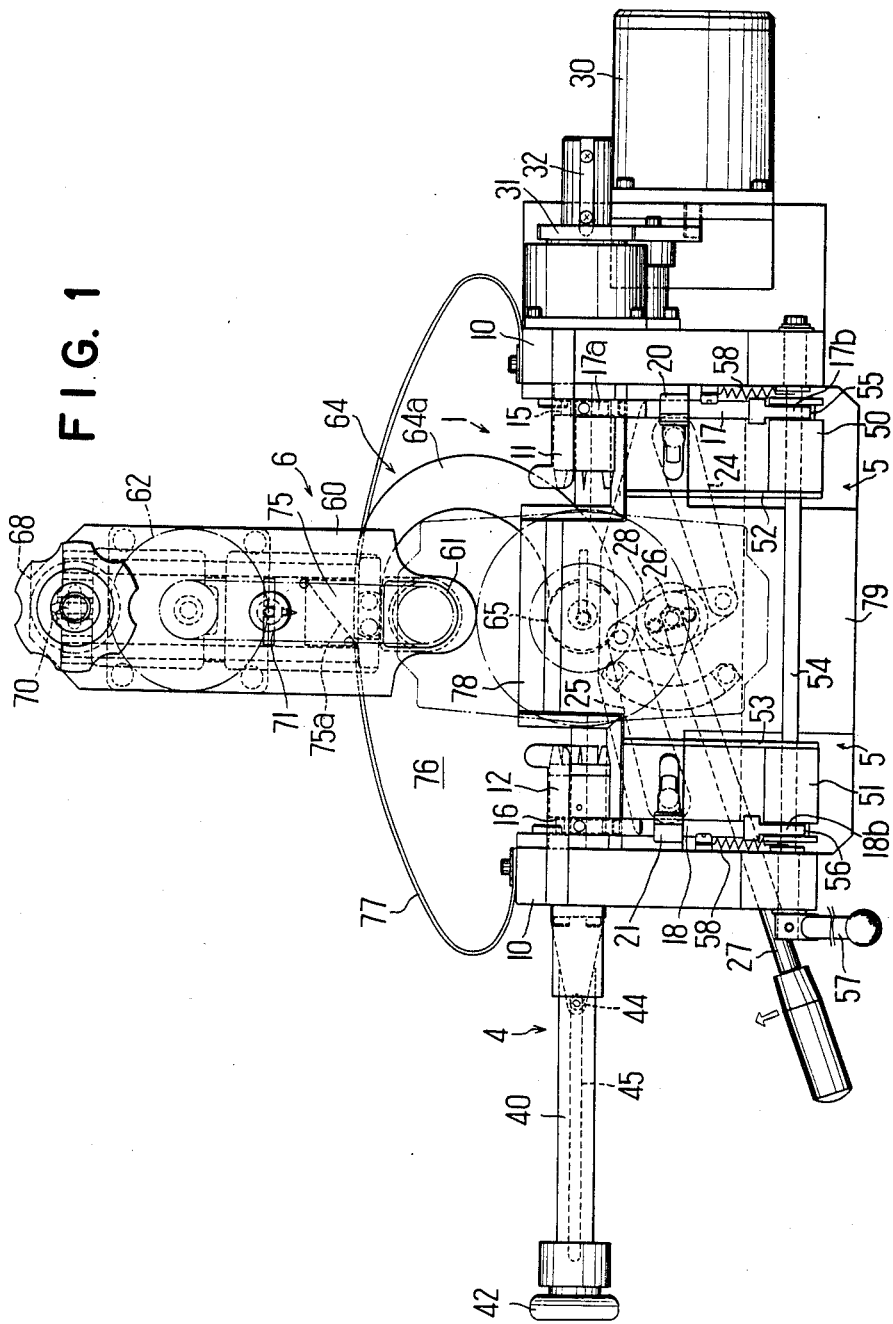
FIG. 1 is a plan view of a peeling machine embodying the present invention.
Figure 2:
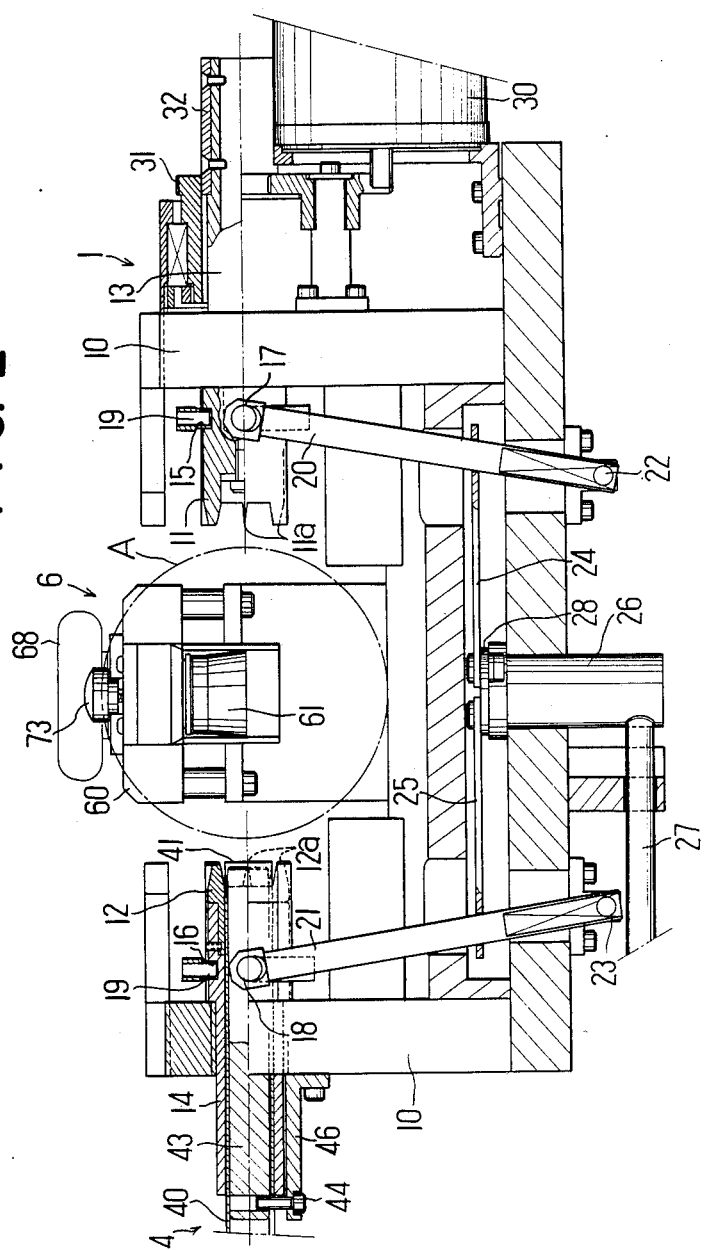
FIG. 2 is a vertical section of the peeling machine of FIG. 1.
Figure 3:
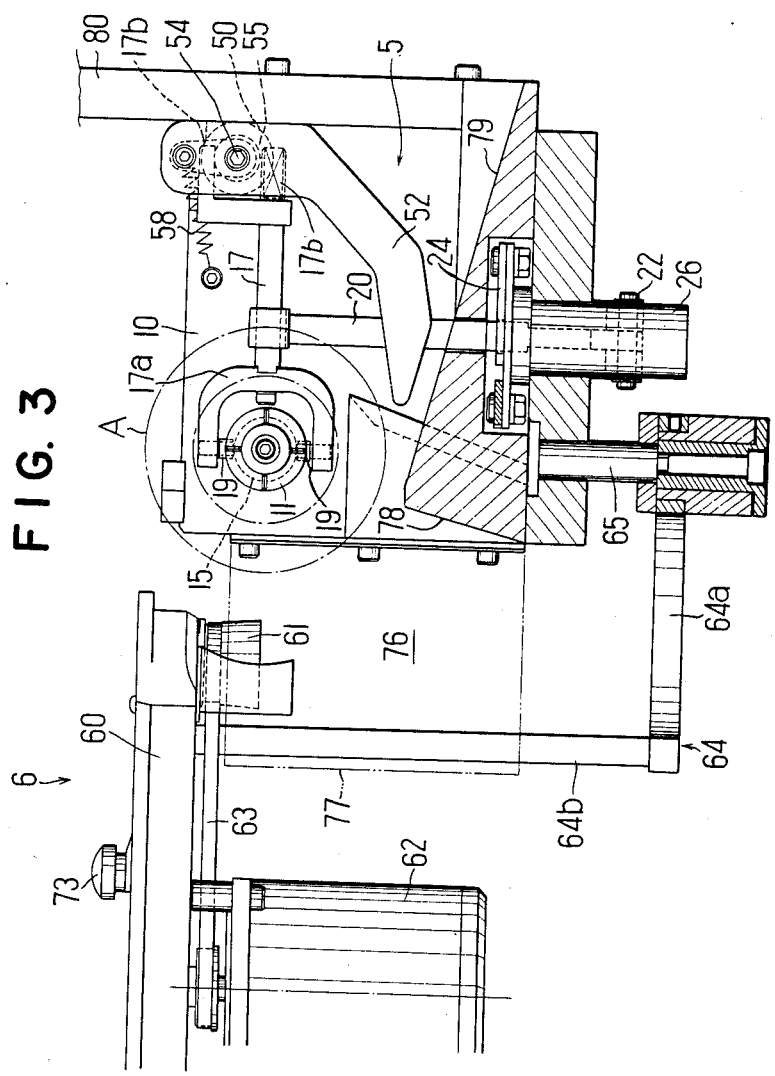
FIG. 3 is a sectioned side view of the same peeling machine.
Figure 4:
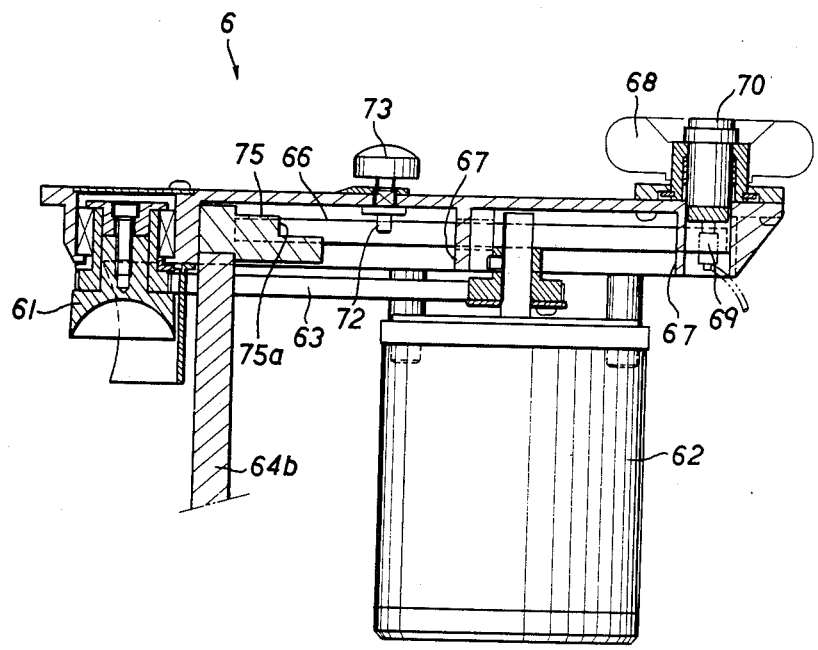
FIG. 4 is a sectional view of a peeler or peeling cutter.

The rotary clamp mechanism 1 functions to rotate the fruit A while holding the opposite end portions of the fruit A, for example, a calyx portion and a diametrically opposite end portion in case of a citrus fruit. As seen in FIGS. 1 to 3, the rotary clamp mechanism 1 is provided with a pair of clamp members 11 and 12 which are opposingly mounted on a machine frame 10. These clamp members 11 and 12 are fitted and fixed by screws on the opposing ends of a pair of rotational shafts 13 and 14 which are rotatably and reciprocably mounted on the machine frame 10 in axial alignment with each other. Alternatively, the clamp members 11 and 12 may be integrally fixed on the respective rotational shafts 13 and 14. The clamp members 11 and 12 are provided with a plural number of claws or prongs 11a and 12a on the opposing surfaces, which claws 11a and 12a are stuck into the fruit A in a depth suitable for holding the fruit A.

One clamp member 11 and the rotational shaft 14 with the other clamp member 12 are circumferentially provided with grooves 15 and 16 in positions close to the opposing inner ends thereof. As shown particularly in FIG. 3, the groove 15 fittingly receives therein pins 19 which are opposingly provided on a bifurcated end portion 17a of a shift member 17. At the other end, the shift member 17 is provided with the end cutter 5 for cutting off the opposite end portions of the fruit A as will be described in detail hereinafter. The circumferential groove 16 on the other rotational shaft 14 is engaged with a shift member 18 having an end portion 18a of the same construction.

As seen in FIGS. 1 to 3, the shift members 17 and 18 have the respective intermediate portions loosely supported in slots at the upper ends of shift levers 20 and 21 for rotation therein. The shift levers 20 and 21 have the base ends thereof rotatably mounted on the machine frame 10 by support shafts 22 and 23, respectively, and have the intermediate portions passed through openings formed in connecting plates 24 and 25 which oscillate the shift levers 20 and 21. The connecting plates 24 and 25 are pivotally supported on the opposite sides of a shaft 26 through a jutting arm 28 which is rotatably mounted on the machine frame 10 by the shaft 26 integrally with a clamp lever 27.

Accordingly, if the clamp lever 27 is turned about the shaft 26 in the arrowed direction in FIG. 1, the paired shift levers 20 and 21 are driven by the connecting plates 24 and 25 to incline toward the center of the machine, as a result displacing the shift members 17 and 18 to advance the clamp members 11 and 12 toward the center of the machine. Thus, a fruit A can be gripped between the clamp members 11 and 12 with its axis of rotation in alignment with the axes of the rotational shafts 13 and 14.

The machine frame 10 mounts thereon a motor 30 for driving one rotational shaft 13 through a gear train serving as a reducer. A gear 31 on the rotational shaft 13 is mounted through a key 32 to permit its sliding movement relative to the axially reciprocable rotational shaft 13 while rotationally interlocking the gear 31 with the shaft 13.

Accordingly, irrespective of the sliding positions of the rotational shafts 13 and 14, the fruit A which is gripped between the two clamp members 11 and 12 is rotated by the motor 30, together with the rotational shaft 14 which follows the rotation of the fruit A.

The rotational shaft 14 which is supported on the machine frame 10 incorporates therein a corer 4. Namely, the corer 4 is constituted by a cylindrical body 40 which is slidably fitted in the rotational shaft 14 and provided with a cylindrical coring blade 41 at its fore end and a handle 42 at its outer end. As shown in FIGS. 1 and 2, the cylindrical body 40 is internally provided with a pusher rod 43 which is advanced toward the inner or fruit holding end of the cylindrical body 40 when the latter is in a retracted position. The pusher rod 43 is fixed by a screw 44 to a mounting block 46 projected from the machine frame 10. The cylindrical body 40 is provided with a slot 45 to prevent the screw 44 from obstructing its axial movements.

Upon pushing in the cylindrical body 40 of the corer 4 by the handle 42, the coring blade 41 is plunged into the fruit A to core it. By pulling the handle 42, the cylindrical body 40 is retracted out of the fruit, and a removed core is pushed out of the body 40 by the relative axial movement of the pusher rod 43.

The end cutter 5, which is associated with the shift members 17 and 18, includes support members 50 and 51 for its cutter blades 52 and 53 which are driven by the shift members 17 and 18 together with the rotational shafts 13 and 14 and slidably supported on a rotary guide shaft 54 as shown in FIGS. 1 to 3. The support members 50 and 51 are provided with grooves 55 and 56 on the respective circumferences to receive therein projections 17b and 18b which are provided at the rear ends of the shift members 17 and 18. The guide shaft 54 is rotatably supported on the machine frame 10, and it has a handle 57 fixedly attached thereto, permitting sliding movements of the cutter blades 52 and 53 and support members 50 and 51 while prohibiting their rotation. The cutter blades 52 and 53 are mounted on the guide shaft 54 in positions slightly inward of the prongs 11a and 12a to be stuck into the fruit. Indicated at 58 are springs which constantly urge the guide shaft 54 toward an initial position.

Accordingly, as the paired shift levers 20 and 21 are driven and inclined inward by the clamp lever 27, advancing the clamp members 11 and 12 toward each other to grip a fruit A therebetween, the cutter blades 52 and 53 are slided on and along the guide shaft 54 together with the support members 50 and 51 to position the respective cutter blades 52 and 53 slightly inward of the clamp members 11 and 12 which are in fruit gripping positions. If the guide shaft 54 is turned by operating the handle 57 against the action of the springs 58 while the fruit is rotated by the motor 30, the opposite end portions of the fruit gripped between the clamp members 11 and 12 are cut off by the cutter blades 52 and 53.

The peeler 6 which serves to strip the fruit A gripped in a peeling position between the paired clamp members 11 and 12 of the rotary clamp mechanism 1 includes, as shown in FIGS. 1 to 4, a peeling blade support 60 with a cup-shaped rotary peeling blade 61 and a drive means (a motor) 62 for rotating the cup-shaped blade 61, and a traverse mechanism for supporting and moving the rotary blade 61 along the surface profile of the rotating fruit.

Namely, the peeling blade 61 is rotatably supported on the blade support 60 which fixedly mounts thereon the above-mentioned drive motor 62 to rotate the peeling blade 61 at high speed through a belt 63 which is passed between the drive motor 62 and the peeling blade 61.

The peeling blade support 60 which supports the rotary peeling blade 61 and its drive motor 62 is adjustably mounted on a support arm 64 which is rotatable about a shaft 65 for traverse movement relative to the machine frame 10. The support arm 64 includes a horizontal portion 64a and a riser portion 64b extending upward from the fore end of the horizontal portion 64a. The horizontal portion 64a is curved to one side to evade the strips of peeled skin which drop into a chute located beneath the rotary peeling blade 61. Guide support rods 66 are project horizontally from the fore end of the riser portion 64b of the support arm 64 to support the peeling blade support 60 adjustably thereon.

On the lower side, the peeling blade support 60 is provided with vertical walls 67 each having holes for slidably receiving the guide support rods 66. Provided on top of the peeling blade support 60 are a knob 68 with a manipulating member 70 for operating a switch 69 of the drive motor 62, and a knob 73 for adjustably fastening an abutting member 72 in an arbitrary position in a slot 71 extending in a direction perpendicular to the sliding direction of the peeling blade support 60. The abutting member 72 restricts the sliding movement of the peeling blade support 60 on the guide support rods 66 by abutting engagement with an inclined surface 75a of a stopper 75 which is provided at the upper end of the riser portion 64b of the support arm 64. Depending upon the position of the abutting member 72 in the slot 71, the peeling blade 61 is located at a different position when the abutting member 72 is in engagement with the sloped surface 75a of the stopper 75.

Accordingly, after fixing the abutting member 72 in a suitable position in the slot 71 by the knob 73, if the peeling blade support 60 is displaced along the guide support rods 66 by manipulating the knob 68 until the abutting member 72 is abutted against the stopper 75, and in this state the support arm 64 which carries the peeling blade support 60 is turned about the shaft 65 on the machine frame 10, the rotary peeling blade 61 is moved along the surface profile of a fruit in the peeling operation.

Since the fruits to be peeled have variations in size, shape and thickness of skin, it is necessary to operate the peeling blade 61 accordingly. The above-described arrangement which permits the peeling blade support 60 to slide along the guide support rods 66 until the abutting member 72 is abutted against the stopper 75 can adjust the radius of rotation about the shaft 65 of the peeling blade 61 on the support arm 64 according to the size of the fruits to be peeled. The rotary peeling blade 61 can be moved according to the shape of a fruit by mounting the shaft 65 on a crosshead, which is not shown, thereby moving the shaft 65 and the support arm 64 toward and away from the machine frame 10.

Figure 5:
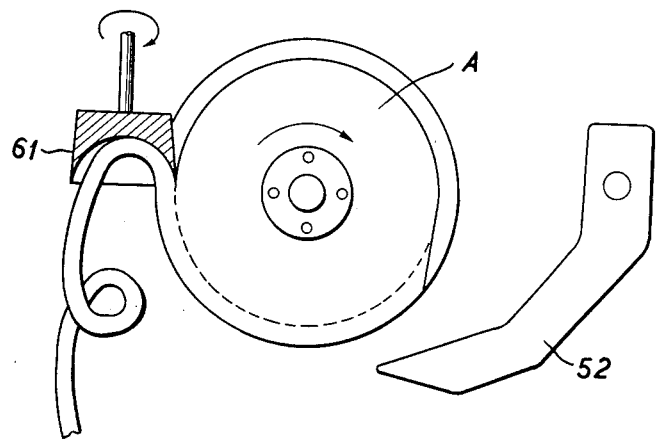
FIG. 5 is a schematic illustration explantory of the peeling operation by a rotary blade.

The cup-shaped rotary blade 61 is rotated about its center axis by the drive motor 62, with the rotational axis held in a direction tangential to the surface of the fruit A gripped and rotated between the clamp members. Desirably, and as shown in FIG. 5, the cutting edge around the brim of the rotating cup is disposed downwardly to peel the skin of the fruit A which is rotated in the arrowed direction. If the peeling blade 61 is contacted with the surface of the fruit A in this manner, the edge of the rotary blade which cut into the skin portion of the fruit is continuously moved in the direction of the blade edge, easily cutting into skin of a fruit which is normally difficult to peel. In a case where the cutting edge of the cup-like rotary blade 61 is disposed downwardly, the strips of the peeled skin hang down in reversed state and drop downward, facilitating the disposal of peeled skin strips or chips.

A cover 77 which is provided behind the machine frame 10 forms a chute beneath the rotary peeling blade 61 in cooperation with a sloped surface 78 on the opposing machine frame portion to guide the peeled skin strips toward a container or the like. A forwardly inclined receptacle member 79 is located beneath the clamped fruit A to guide the peeled fruits into a container which is located on its front side.

Figure 6:
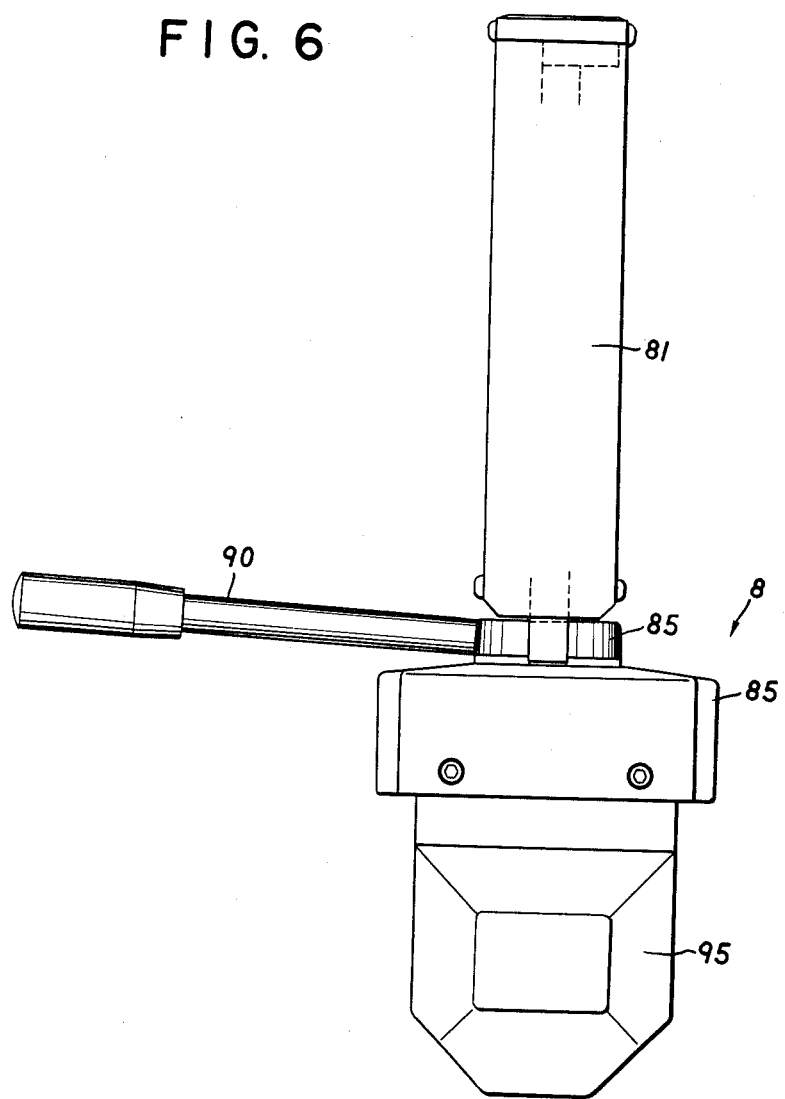
FIG. 6 is a front view of a fruit feeder.
Figure 7:
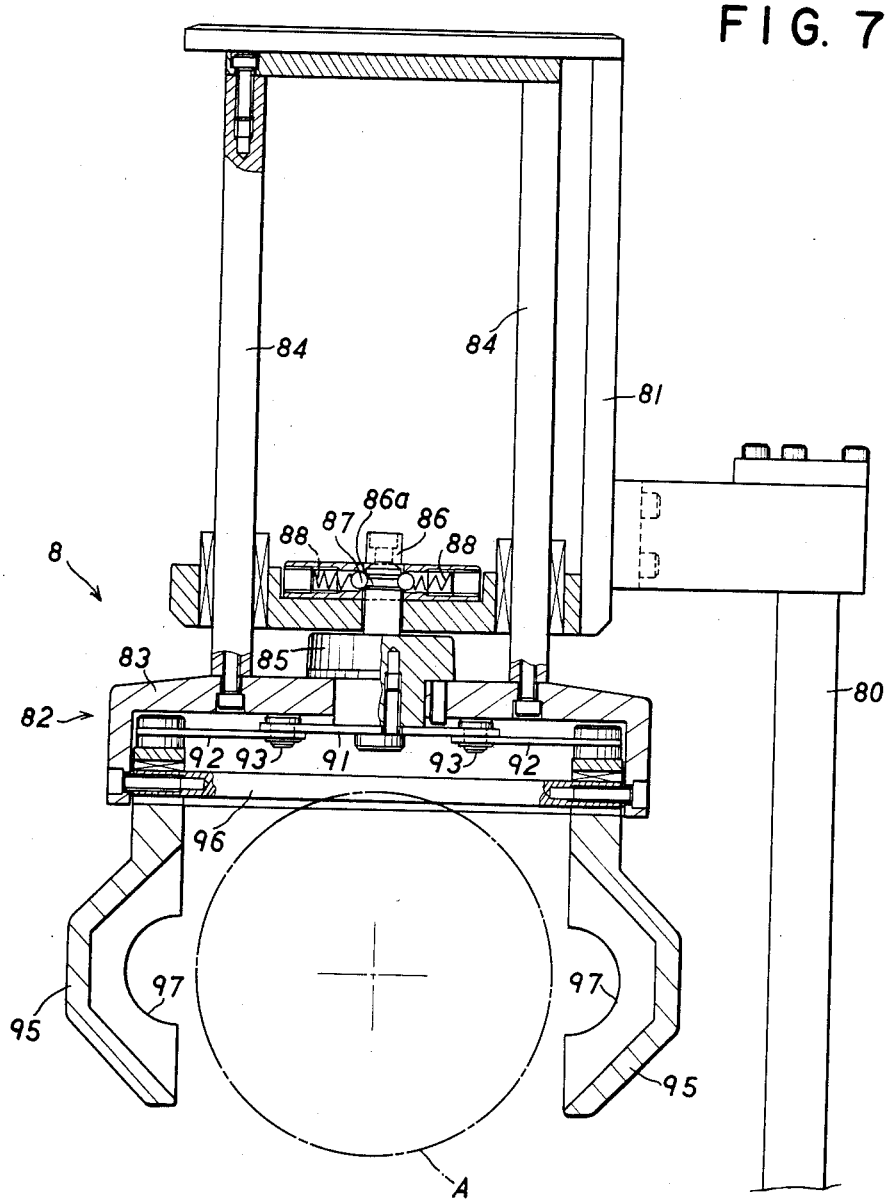
FIG. 7 is a sectioned side view of the fruit feeder.
Figure 8:
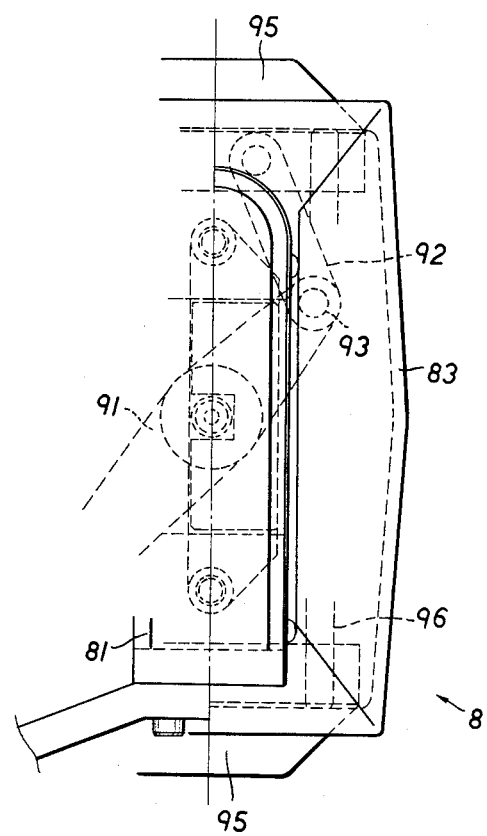
FIG. 8 is a fragmentary plan view of the fruit feeder.

The rotary clamp mechanism 1 of the above-described peeling machine should grip a fruit A appropriately between the two clamp members 11 and 12. FIGS. 6 to 8 show an example of a fruit feed mechanism 8 which can suitably supply fruits for this purpose. However, it may be replaced by an automatic feed mechanism or manual feed if desired.

The fruit feed mechanism 8 of FIGS. 6 to 8 is located immediately above a predetermined fruit gripping position between the two clamp members 11 and 12, by means of a post 80 which is erected on the machine frame 10, and provided with a fruit holder 82 which is slidably mounted on a support frame 81 on the post 80. The fruit holder 82 includes guide rods 84 which are erected on a support plate 83 and vertically slidable under guidance of the support frame 81. A head shaft 86 projects upwardly from a rotary member 85 and is temporarily engaged by a detent mechanism on the support frame 81 when the fruit holder 82 reaches an uppermost position. The just-mentioned detent mechanism includes balls 87 which are biased by springs 88 and are resiliently engageable with a groove 86a on the circumference of the head shaft 86 for temporarily holding the same.

The rotary member 85 which is rotatably mounted on the support plate 83 is provided with a laterally extending handle 90 above the support plate 83. On the other hand, an arm plate 91 projects on the opposite sides of and is connected to the rotary member 85 under the support plate 83. Fruit holder cups 95 are supported on connecting plates 92 which are pivotally connected to the opposite ends of the arm plate 91 by pins 93.

The fruit holder cup 95 in the form of opposingly facing cups are movable toward and away from each other along a pair of guide rods 96, and they are provided with arcuate recesses 97 so as not to interfere with the fruit gripping action of the clamp members 11 and 12.

In the lifted position shown, the fruit feed mechanism 8 positions a fruit A between the holder cups 95, and, upon turning the handle 90, the holder cups 95 are moved toward each other through the arm plate 91 and the connecting plates 92 to hold a fruit between the holder cups 95. If the handle 90 is pushed down in this state, the fruit which is held between the feeder cups 95 is lowered to an appropriate position between the clamp members 11 and 12 of the rotary clamp mechanism 1 to let the clamp members grip the fruit appropriately therebetween.

Generally, a fruit does not necessarily have the calyx at the center of its body, so that, in machine peeling, it is most desirable to rotate a fruit about the center axis of its outer configuration in parallel relation with an axis passing through the calyx. The above-described fruit holders 95 of cup shape can grip therebetween a fruit easily in an appropriate state holding the axis of the fruit parallel with the axis of the rotational shafts 13 and 14 of the rotary clamp mechanism 1 to peel the fruit without losses.

In a case where the above-described peeling machine is used for peeling spherical fruits like citrus fruits, a fruit to be peeled is delivered by the fruit feed mechanism 8 to the peeling position between the opposing clamp members 11 and 12 of the rotary clamp mechanism 1 according to the configuration and calyx position of the fruit. Then, while rotating the fruit by the rotational shaft 13, the rotating cup-shaped peeling blade 61 of the peeler 6 is moved along the profile of the fruit surface to peel its skin. In the next stage of operation, the coring blade 41 at the tip end of the cylindrical body 40 of the corer 4 is plunged into the fruit to core the same, followed by removal of the end portions of the fruit by the cutter blades 52 and 53 of the end cutter 5. As a result of the foregoing operation, there can be obtained only the edible flesh portion of the fruit. Besides, the three different operations of peeling, coring and end cutting can be performed on a fruit in one clamp position and in an extremely sanitary manner without touching the fruit.

The plunging movement of the coring blade 41 is stopped short of the skin on the side of the rotational shaft 13 in the above-described coring operation, and the cutter blades 52 and 53 of the end cutter 5 are operated not to cut off the end portions completely, so that the core will be connected with the end cuttings and easily separated from the peeled flesh portion together with the end cuttings.

The above-described peeling machine can be applied to fruits and vegetables of various shapes and sizes by controlling the movement of the rotary peeling blade, altering the diameter of the coring blade, or adjusting the distance between the end cutting blades accordingly.

We claim:

1. A peeling machine for automatically stripping skin from a citrus fruit, said machine comprising:
    (a) a rotary clamp mechanism for gripping and rotating a citrus fruit in a predetermined peeling position and
    (b) a cutting device comprising:
        (i) a peeling cutter having a cup-shaped peeling blade rotatable about a center axis thereof, having a cutting edge all the way around a brim of said cup-shaped peeling blade, and having a shaft projecting from the bottom of said cup-shaped peeling blade along said center axis away from said cutting edge, said peeling cutter having no discharge hole other than the opening of said cup-shaped peeling blade;
        (ii) a driving means for rotating said shaft; and
        (iii) means for moving said peeling cutter along the surface of a citrus fruit which is held and rotated by said rotary clamp mechanism while maintaining a relative position between said cup-shaped peeling blade and the citrus fruit which is set such that the center axis of said cup-shaped peeling blade is parallel to a line tangential to the surface of the citrus fruit at the point of contact with the citrus fruit and such that the outside of said cup-shaped peeling blade contacts the surface of the citrus fruit from the outside thereof and then cuts thereinto, after which a continuous strip of citrus peel slides along the rotating surface of said cup-shaped peeling blade and is discharged from the opening of said cup-shaped peeling blade in at least generally the opposite direction from the direction in which it enters said cup-shaped peeling blade.

2. The peeling machine of claim 1, wherein said cutting edge of said cup-shaped peeling blade is disposed downwardly.

3. The peeling machine of claim 2, and further comprising:
    (a) a chute located beneath said cup-shaped peeling blade to direct strips of peeled skin toward a container and
    (b) a tray located beneath said predetermined peeling position to receive the peeled fruit or vegetable thereon.

4. The peeling machine of claim 1, wherein said cup-shaped peeling blade and said driving means are mounted on a peeling blade support capable of moving said cup-shaped peeling blade along the profile of the fruit or vegetable.

5. The peeling machine of claim 4, wherein said peeling blade support is mounted on a machine frame by a support arm having a horizontal portion rotatably supported on said machine frame and a riser portion extending upwardly from the fore end of said horizontal portion.

6. The peeling machine of claim 5, wherein said horizontal portion of said support arm is curved to one side to avoid strips of peeled skin dropping into a chute from said cup-shaped peeling blade.

7. The peeling machine of claim 5 or 6, wherein the base end of said support arm is adjustably supported on said machine frame.

8. The peeling machine of claim 1, wherein:
    (a) said rotary clamp mechanism comprises a pair of clamp members opposingly located on a machine frame and
    (b) said pair of clamp members are mounted at the opposing ends of a pair of axially aligned rotational shafts rotatably mounted on said machine frame and movable toward and away from each other.

9. A peeling machine for automatically stripping skin from a fruit or vegetable, said machine comprising:
    (a) a rotary clamp mechanism for gripping and rotating a fruit or vegetable in a predetermined position and
    (b) a cutting device comprising:
        (i) a peeling cutter having a cup-shaped peeling blade rotatable amount a center axis thereof and having a cutting edge around a brim of said cup-shaped peeling blade;
        (ii) a driving means for rotating said cup-shaped peeling blade; and
        (iii) means for moving said peeling cutter along the surface of a fruit or vegetable which is held and rotated by said rotary clamp mechanism while maintaining a relative position between said cup-shaped peeling blade and the fruit or vegetable which is set such that the center axis of said cup-shaped peeling blade is parallel to a line tangential to the surface of the fruit or vegetable at the point of contact with the fruit or vegetable and such that the outside of said cup-shaped peeling blade contacts the surface of the fruit or vegetable from outside thereof and then cuts thereinto, wherein:
    (c) said rotary clamp mechanism comprises a pair of clamp members opposingly located on a machine frame;
    (d) said pair of clamp members are mounted at the opposing ends of a pair of axially aligned rotational shafts rotatably mounted on said machine frame and movable toward and away from each other; and (e) said peeling machine further comprises a pair of shift members simultaneously movable toward the center of the machine by manipulation of a clamp lever to advance said pair of clamp members toward gripping positions.

10. The peeling machine of claim 9, wherein said pair of axially aligned rotational shafts are circumferentially provided with grooves in positions close to the opposing inner ends thereof to receive pins at the upper ends of said pair of shift members.

11. The peeling machine of claims 8, 9, or 10, wherein:
 (a) one of said pair of axially aligned rotational shafts is driven from a motor through a reducing gear train to rotate a fruit or vegetable gripped between said pair of clamp members and
 (b) the other one of said pair of axially aligned rotational shafts is adapted to follow the rotation of the fruit or vegetable.

12. The peeling machine of claim 11, and further comprising a corer having a cylindrical body provided with a cylindrical coring blade at the inner end and a handle at the outer end thereof, said corer being slidably received in said other one of said pair of axially aligned rotational shafts.

13. The peeling machine of claims 9 or 10, and further comprising:
 (a) a rotary guide shaft supported on each one of said pair of axially aligned rotational shafts in parallel relation therewith and
 (b) a cutter blade slidably and rotatably supported one each one of said rotary guide shafts to cut off end portions of a fruit or vegetable rotatain between said pair of clamp members.

14. The peeling machine of claim 13, wherein each one of said cutter blades is mounted on a blade support axially driveable together with the corresponding one of said pair of axially aligned rotational shafts by the corresonding one of said shift members, each one of said blade supports being slidably and rotatably supporting on the corresponding one of said pair of axially aligned rotary guide shafts to cut off an end portion of the fruit or vegetable.

15. A peeling machine for automatically stripping skin from a fruit or vegetable, said machine comprising:
 (a) a rotary clamp mechanism for gripping and rotating a fruit or vegetable in a predetermined position and
 (b) a cutting device comprising:
  (i) a peeling cutter having a cup-shaped peeling blade rotatable amount a center axis thereof and having a cutting edge around a brim of said cup-shaped peeling blade;
  (ii) a driving means for rotating said cup-shaped peeling blade; and
  (iii) means for moving said peeling cutter along the surface of a fruit or vegetable which is held and rotated by said rotary clamp mechanism while maintaining a relative position between said cup-shaped peeling blade and the fruit or vegetable which is set such that the center axis of said cup-shaped peeling blade is parallel to a line tangential to the surface of the fruit or vegetable at the point of contact with the fruit or vegetable and such that the outside of said cup-shaped peeling blade contacts the surface of the fruit or vegetable from outside thereof and then cuts thereinto, wherein:
 (c) said cup-shaped peeling blade and said driving means are mounted on a peeling blade support capable of moving said cup-shaped peeling blade along the profile of the fruit or vegetable;
 (d) said peeling blade support is mounted on a machine frame by a support arm having a horizontal portion rotatably supported on said machine frame and a riser portion extending upwardly from the fore end of said horizontal portion; and
 (e) said support arm has guide support rods extending horizontally from the tip end of said riser portion for adjustably supporting said peeling blade support thereon, said peeling blade support having a vertical wall on the lower side thereof and throughholes formed in said vertical wall for slidably receiving guide support rods.

16. The peeling machine of claim 15, wherein said support arm is provided with a stoppe at the upper end of said riser portion for limiting the sliding movement of said peeling blade support on said guide support rods in cooperation with an abutting member adjustably fixed on said peeling blade support and abuttingly engageable with a sloped surface on said stopper.

17. A peeling machine for automatically stripping skin from a fruit or vegetable, said machine comprising:
 (a) a rotary clamp mechanism for gripping and rotating a fruit or vegetable in a predetermined position and
 (b) a cutting device comprising:
  (i) a peeling cutter having a cup-shaped peeling blade rotatable amount a center axis thereof and having a cutting edge around a brim of said cup-shaped peeling blade;
  (ii) a driving means for rotating said cup-shaped peeling blade; and
  (iii) means for moving said peeling cutter along the surface of a fruit or vegetable which is held and rotated by said rotary clamp mechanism while maintaining a relative position between said cup-shaped peeling blade and the fruit or vegetable which is set such that the center axis of said cup-shaped peeling blade is parallel to a line tangential to the surface of the fruit or vegetable at the point of contact with the fruit or vegetable and such that the outside of said cup-shaped peeling blade contacts the surface of the fruit or vegetable from outside thereof and then cuts thereinto, wherein:
 (c) said rotary clamp mechanism comprises a pair of clamp members opposingly located on a machine frame;
 (d) said pair of clamp members are mounted at the opposing ends of a pair of axially aligned rotational shafts rotatably mounted on said machine frame and movable toward and away from each other; and
 (e) said peeling machine further comprises a feed mechanism located immediately above a predetermined clamp position between said pair of clamp members by means of a post erected on said machine frame, said feed mechanism including a pair of holder cups adapted to hold a fruit or vegetable therebetween and being movable along a frame on said post to transfer the fruit or vegetable to the predetermined peeling position between said pair of clamp members.

* * * * *